235-381 SR

2/24/81 OR 4,253,016

United States Patent [19]

Hirose

[11] 4,253,016

[45] Feb. 24, 1981

[54] AUTOMATIC APPARATUS FOR DISPENSING AND RECEIVING BANK NOTES

[75] Inventor: Minoru Hirose, Yokohama, Japan

[73] Assignee: Tokyo Shibaura Denki Kabushiki Kaisha, Kawasaki, Japan

[21] Appl. No.: 100,142

[22] Filed: Dec. 4, 1979

[30] Foreign Application Priority Data

Dec. 6, 1978 [JP] Japan .......................... 53-167721[U]

[51] Int. Cl.[3] ........................ G06F 7/08; G06K 13/00

[52] U.S. Cl. .......................... 235/381; 194/DIG. 26; 235/475

[58] Field of Search ............... 235/381, 431, 425, 475; 194/DIG.26, 24, 2, 4 F; 222/2; 340/149 A; 221/94, 95

[56] References Cited

U.S. PATENT DOCUMENTS

| | | | |
|---|---|---|---|
| 3,648,020 | 3/1972 | Tateisi et al. | 194/DIG. 26 |
| 3,888,267 | 6/1975 | Gautschi | 194/DIG. 26 |
| 3,934,693 | 1/1976 | Ooyama et al. | 194/DIG. 26 |
| 4,017,004 | 4/1977 | Onoe et al. | 194/DIG. 6 |

*Primary Examiner*—Daryl W. Cook

*Attorney, Agent, or Firm*—Cushman, Darby & Cushman

[57] ABSTRACT

Disclosed is a dispensing-receiving apparatus for bank notes in which bank notes issued in accordance with an operator's designating operation and rejectable bank notes among ones received in the apparatus are both delivered through a single paying outlet formed in a control panel surface. A receiving device and a dispensing device of unit construction are piled up inside an apparatus casing. A return path system for rejectable note return, which is connected between a bank note intake conveyor system in the receiving device and a bank note takeout conveyor system in the dispensing device, is completed when both these devices are brought to respective setting positions in the apparatus casing.

10 Claims, 7 Drawing Figures

AUTOMATIC APPARATUS FOR DISPENSING AND RECEIVING BANK NOTES

BACKGROUND OF THE INVENTION

This invention relates to an automatic dispensing-receiving apparatus which may, for example, be set in the lobby of a bank to allow customers to perform for themselves operations for transactions with use of bank notes.

With the elimination or reduction of labor for banking business, for example, automatic depositing apparatuses and automatic cash dispensing machines have recently been developed and put to practical use. An automatic dispensing-receiving apparatus capable of both payment and receipt has further been developed. The last-mentioned apparatus is generally referred to as "an automatic teller machine" (abbreviated as ATM).

Capable of using several mechanical sections, such as printer, I.D. card reader, etc., in common, one such automatic dispensing-receiving apparatus may be substantially lower than a combination of an automatic depositing apparatus and a cash dispensing machine in manufacturing cost. Moreover, the former may ensure a saving of setting space as well as customers' convenience.

Referring now to the drawing of FIG. 1, there will be given an outline of a prior art automatic dispensing-receiving apparatus, as a premise for the description of this invention. The apparatus of FIG. 1 is so constructed that a receiving device (b) and a dispensing device (c) are horizontally arranged in parallel with each other in an apparatus casing (a). On one side (right-hand side of FIG. 1) of a front-side control surface of the casing (a) that corresponds to the receiving device (d), there are disposed a receiving inlet (d) to receive bank notes, a rejectable note return outlet (e) for rejectable note return, and an I.D. card inlet slot (f). On the other side (left-hand side of FIG. 1) of the control surface of the casing (a) that corresponds to the dispensing device (c), moreover, there are provided a keyboard (g) for inputting an amount to be paid, a display section (h) to indicate the present stage of transaction, a paying outlet (k) to bank notes, and an inlet slot (m) through which a passbook is inserted.

Although the prior art apparatus of such construction, as described above, can be set in a space narrower than the space required for the combination of the receiving and dispencing apparatuses, it still is considerably bulky, and cannot promise a substantial reduction in manufacturing cost. The reason is that, the receiving and dispensing devices separately set in the conventional apparatus are each provided with an independent bank note conveyor system and consequently are loosely connected in mechanical arrangement.

SUMMARY OF THE INVENTION

The object of this invention is to provide a novel automatic dispensing-receiving apparatus for transactions with use of bank notes which eliminates the above-mentioned various drawbacks of the prior art apparatus, and exhibits many advantages including compactness in structure, reduced manufacturing cost, ease of maintenance and inspection of the internal mechanisms, improved stability of operation, and users' ease of operations for transactions.

In order to attain the above objects, an automatic dispensing-receiving apparatus according to this invention is not provided with an exclusive-use return outlet for rejectable notes, but with an ordinary paying outlet which can fulfill the function of such return outlet besides its original function. For this purpose, a rejectable note return path system diverging from a bank note intake conveyor system in a receiving device is connected with a bank note takeout conveyor system extending from the paying outlet to a paying safe in a dispensing device, thereby saving the space for the conveyor systems. Further, the width of the dispensing-receiving apparatus is reduced by laying the dispensing device on top of the receiving device inside a casing. Moreover, the receiving and dispensing devices are formed into each individual unit, and can independently be drawn out from the casing. Thus, the individual devices may separately undergo maintenance and inspection, ensuring secure and speedy operations therefor. The rejectable note return path system, which is divided into two respective sections for the receiving and dispensing units, is completed by connecting these sections when both units are set in the casing.

Figure 1:
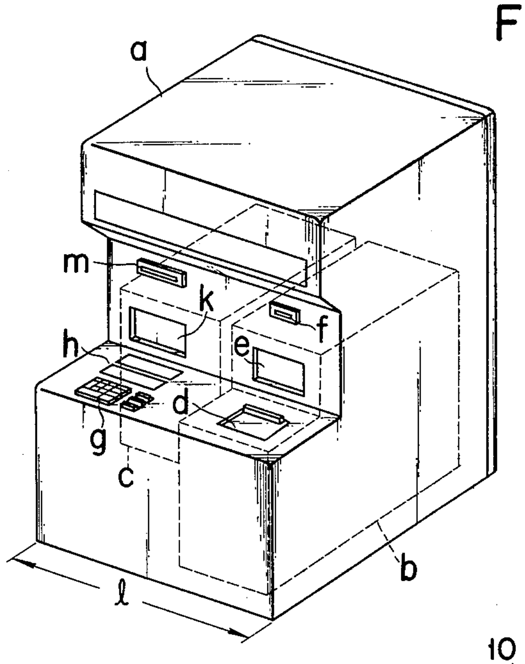
FIG. 1 PRIOR ART
FIG. 1 is an external perspective view of a prior art automatic dispensing-receiving apparatus.

Referring now to the drawings of FIGS. 2 to 7, the automatic dispensing-receiving apparatus of this invention will be described in detail.

DETAILED DESCRIPTION OF THE PREFERRED EMBODIMENT

Figure 2:
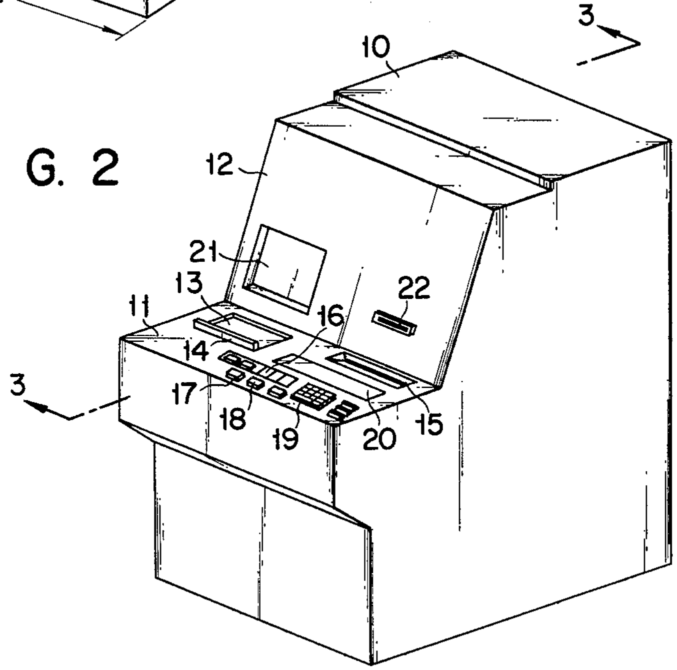
FIG. 2 is a front perspective view of an automatic dispensing-receiving apparatus according to this invention.

In a bank note dispensing-receiving apparatus according to this invention the exterior of which is shown in FIG. 2, there are provided a substantially horizontal control panel surface 11 on the front side of an apparatus casing 10 and a vertical control panel surface 12 vertically extending from the rear edge of the surface 11 and battering to some degree.

The horizontal control panel surface 11 is provided with a receiving inlet 13 to receive bank notes and a passbook inlet slot 15 beside the inlet 13, the inlet 13 having a slide cover 14 capable of opening and closing. On the panel surface 11, moreover, there are provided a count display section 16 to display an input amount of money, transaction approval key 17, transaction disapproval key 18, ten-key 19 for inputting the transaction amount, and a display section 20 to inform customers of the present stage of transaction by letters.

On the other hand, the vertical panel surface 12 is provided with a single paying outlet 21 and an I.D. card inlet slot 22 beside the same.

Figure 5:
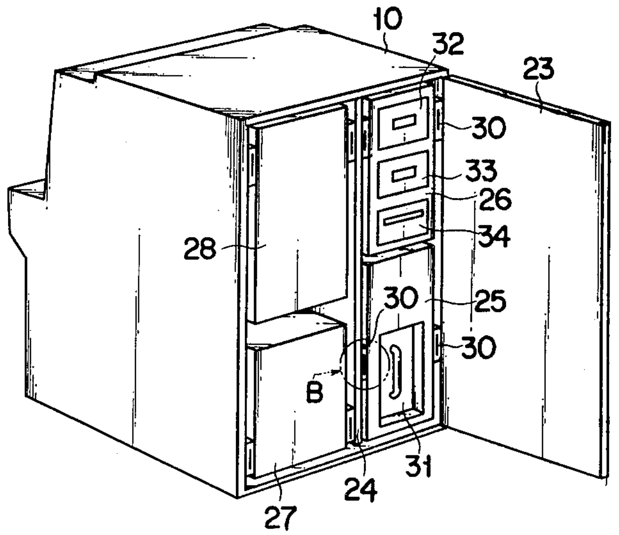
FIG. 5 is a rear perspective view of the automatic dispensing-receiving apparatus of FIG. 2 with its door open.

On the rear side of the casing 10, a door 23 is hinge-coupled along one side edge of the casing 10, as shown in FIG. 5. The door 23, which is in an open position of FIG. 5, normally is closed and locked.

In FIG. 5, the interior of the casing 10 is partitioned right and left by means of a center partition wall 24. Disposed in one compartment on one side of the partition wall 24 are a receiving device 25 at the bottom and a dispensing device 26 lying on top of the receiving device 25. In the other compartment, there are a printer 27 and an I.D. card reader 28 lying on top thereof.

All these devices have unit construction, and can separately be taken out backward from the casing 10 with the door 23 opened. They are so constructed as to be able to be horizontally moved for the setting and removal in and from the casing 10 by means of slide rail mechanisms 30.

Inside the modular receiving device (hereinafter referred to as the receiving unit) 25, there is a receiving safe 31 to contain received bank notes. The safe 31 can independently be drawn out backward from the receiving unit 25. Also, inside the modular dispensing device (hereinafter referred to as the dispensing unit) 26, there are two paying safes 32 and 33 containing bank notes of different denominations and a recovery safe 34 successively arranged in the vertical direction. Like the receiving safe 31, these three safes can independently be drawn out backward from the dispensing unit 26. These safes constitute subunit.

Figure 6:
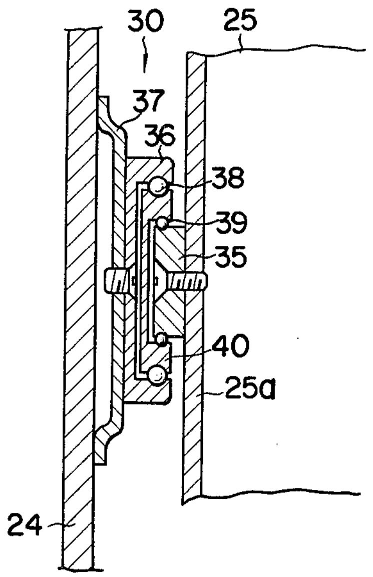
FIG. 6 is an enlarged sectional view of a guide rail structure portion (B) enclosed with a chain-line circle of FIG. 5.
Figure 7:
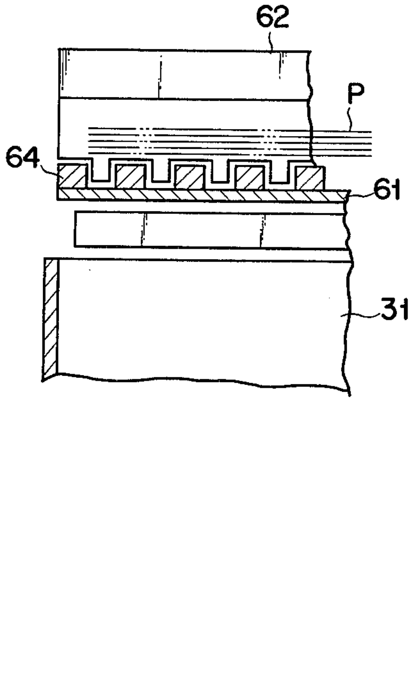
FIG. 7 is an enlarged partial sectional view of the apparatus as taken along line 7—7 of FIG. 3.

All the slide rail mechanisms 30 shown in FIG. 5 are substantially the same in construction, and FIG. 6 shows an enlarged view of the rail structure at a portion B enclosed with a chain-line circle of FIG. 5, by way of example.

Referring now to FIG. 6, the slide rail mechanism 30 is interposed between the center partition wall 24 and the receiving unit 25, an inner rail 35 is screwed to a side frame 25*a* of the receiving unit 25, an outer rail 36 is fixed to the center partition wall 24 by means of a mounting plate 37 screwed to the rail 36, and a retainer 40 is interposed between the inner and outer rails across ball bearings 38 and 39. Thus, the receiving inlet 25 is supported on the wall 24 and is allowed smoothly to move relatively to the wall 24. The setting position of the receiving unit 25 inside the casing 10 is restricted by a suitable stopper means (not shown), and the receiving unit 25 is releasably locked to the setting position by a suitable locking mechanism (not shown), so that the unit 25 will never be shifted during operation.

Figure 3:
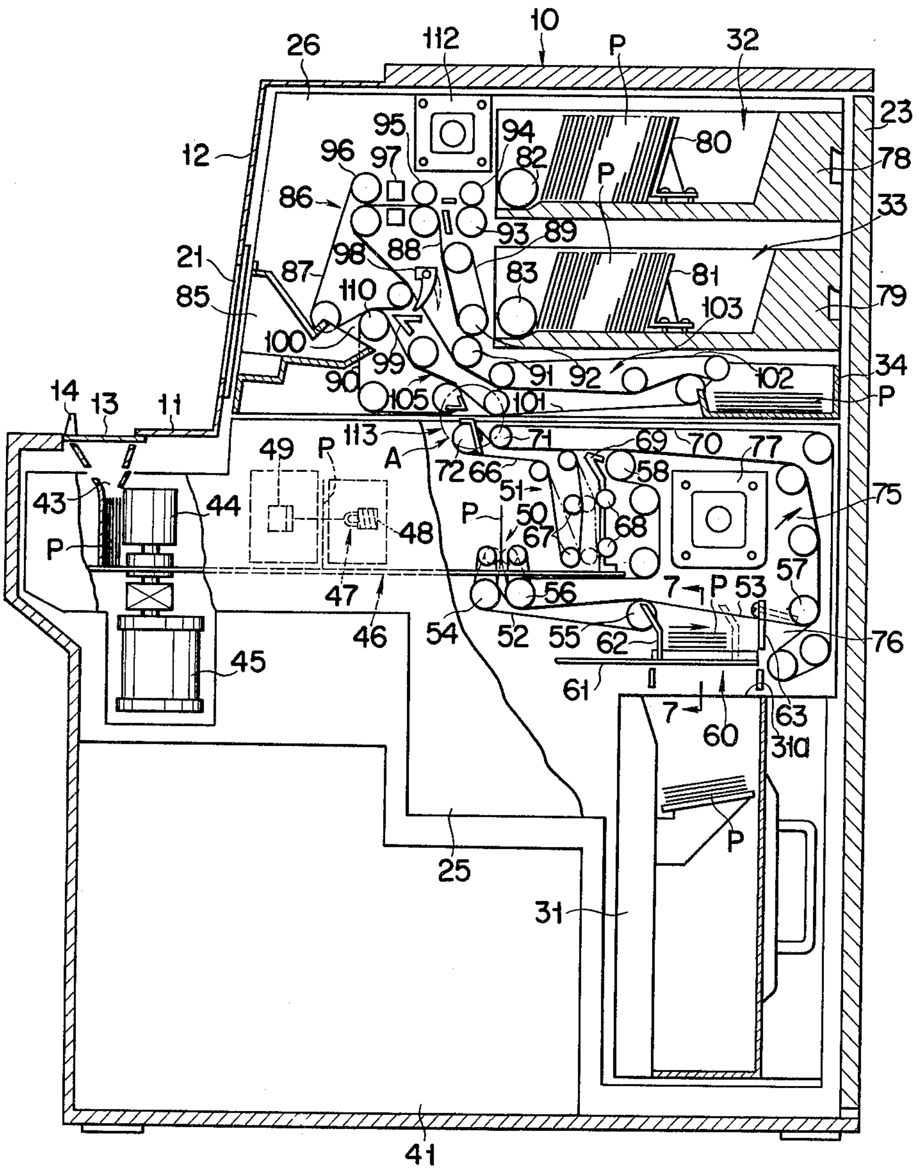
FIG. 3 is an enlarged profile of the apparatus as taken along line 3—3 of FIG. 2.

Referring now to FIG. 3, the lower region of the casing 10 is occupied by the receiving unit 25 in the setting position except a space for an electric power supply control section 41 in the lowermost position, while the upper region is occupied by the dispensing unit 26 in its setting position.

Inside the receiving unit 25, the receiving safe 31 is located in a backward bottom position. Inside the dispensing unit 26, the two paying safes 32 and 33 are arranged vertically in parallel with each other at the upper portion on the rear side, and the receiving safe 34 is disposed thereunder.

On the front-end side of the receiving unit 25, a receiving pocket 43 is located right under the receiving inlet 13. An intake roller 44, which is partially exposed to the pocket 43, is rotated by a motor 45 in the receiving unit 25. A bank note intake conveyor system 46 extends backward from the intake roller 44. The conveyor system 46 is formed of endless belts and rollers to support the belts (not shown).

The opening and closing cover 14 at the receiving inlet 13 is automatically opened by a driving mechanism (not shown) at time of receiving operation. Bank notes P put in the apparatus through the opened receiving inlet 13 by a customer are received in a bundle into the receiving pocket 43. The notes P in the pocket 43 are carried upright to the conveyor system 46 one by one as the intake roller 44 rotates. In the conveyor system 46, there is disposed a detector 47 composed of a light source 48 and a sensing element 49 as indicated by broken lines, where the passage of the bank notes is detected and timing signals or the like are given.

The bank notes P passed through the detector 47 are further transferred backward along the conveyor system to reach a direction changing portion 50, where fit notes for the transaction are sorted from unfit ones. For this purpose, a sorting gate (not shown) is provided at the portion 50, directing the unfit rejectable notes toward a first return path system 51 and guiding the fit notes further backward along the continuedly extending intake conveyor system 46. The continued portion of the intake conveyor system 46 is formed of two endless belts 52 and 53; the belt 52 is stretched between a pair of rollers 54 and 55, and the belt 53 between a number of guide rollers including rollers 56, 57 and 58. In the terminal position of the intake conveyor system 46, there is a temporary note collecting section 60 which is so located as just to cover a top opening portion 31*a* of the receiving safe 31. The fit bank notes P are collected in piles, as shown in FIG. 3.

The temporary collecting section 60 is defined by a slide bottom plate 61 to receive the bank notes P, and an extruding plate 62 and a closing plate 63 disposed at a distance from each other to constitute the side plates of the collecting section 60. As shown in the enlarged partial view of FIG. 7, the collecting section 60 is so formed that a comblike member 64 fixed to the top of the slide bottom plate 61 engages a comblike bottom edge 62*a* of the extruding plate 62 with a narrow gap left between them. Accordingly, when the bottom plate 61 is slidden to the left of FIG. 3, the bank notes P are stopped by the extruding plate 62 by running thereagainst. When the bottom plate 61 is removed fully to open the top opening 31*a* of the receiving safe 31, the notes are dropped into the receiving safe 31 to be collected therein. The comblike structure of the extruding plate 62 and bottom plate 61 enables all the bank notes to be securely set in the rest position.

The first return path system 51 includes an endless belt 66. The rejectable notes delivered from the direction changing portion 50 are held between rollers 68, 68 and a portion of the belt 66 shifted to a chain-line position by movable rollers 67, 67 pulled up under the guidance of guide plates 69, and carried upward between the belt 66 and a portion of an endless belt 70 in contact with the belt 66. At the top portion of the first return path system 51, a small-diameter roller 71 around which the endless belt 70 is partially wound and a large-diameter roller 72 around which the endless belt 66 is partially wound are disposed at a distance from each other, a V-shaped delivery port 73 (FIG. 4) being defined between the rollers 71 and 72 by the belts 66 and 70. The rejectable notes are delivered to the dispensing unit side above the rollers 71 and 72 through the delivery port 73. This operation will later be described with reference to FIG. 4.

An auxiliary return path system 75 is defined between the temporary collecting section 60 and the first return path 51. This system is composed of the endless belts 53 and 70, and a sidelong-V-shaped note admission port 76 is so defined as to be opened forward the closing plate 63.

When the customer wants to take back the bank notes he previously put in, he pushes the transaction disapproval key 18 on the horizontal panel surface 11. Then, the closing plate 63 is rocked to a position indicated by the broken line of FIG. 3 to open the note admission port 76. Thereafter, the extruding plate 62 pushes the bank notes P collected at the temporary collecting section 60 along the direction of the arrow into the admission port 76, thereby causing the notes to be carried upward along the auxiliary return path system 75 and to be delivered to the first return path system 51.

In the receiving unit 25, a motor 77 is disposed as a driving source for supplying driving power to the takeout conveyor system 46, first return path system 51 and auxiliary return path system 76. When the receiving unit 25 is set in the casing 10, the motor 77 and the power supply control section 41 are connected electrically.

The paying safes 32 and 33 removably set in the dispensing unit 26 are composed respectively of magazine cases 78 and 79, spring-urged backup plates 80 and 81, and takeout friction rollers 82 and 83. Such construction, however, is not novel at all in itself.

At the forward end portion of the dispensing unit 26, there is disposed a paying pocket 85 which corresponds to the paying outlet 21 when the unit 26 is in a setting position inside the casing 10. A bank note takeout conveyor system 86 is defined between the paying safes 32 and 33 and the paying pocket 85. The conveyor system 86 includes four endless belts 87, 88, 89 and 90 which partially overlap one another in proper manner. Pairs of rollers 91 and 92; 93 and 94 are disposed correspondingly to the respective takeout-side ends of the two paying safes 32 and 33. The bank notes P taken out of the upper paying safe 32 are passed through the paired rollers 93 and 94 to be horizontally moved from a pair of rollers 95 to a pair of rollers 96 along the belt 88. Between these two pairs of rollers, the passage of the notes is detected by a detector 97. Further, the bank notes P are moved downward while being held between the belts 87 and 88, passed through a switching gate 98 and a guide member 99 and between the belts 87 and 90, and finally delivered to the paying pocket 85 through a substantially inverted V-shaped delivery port 100. Thus, the customer can take out the bank notes P from the paying pocket 85, putting his hand into the pocket 85 through the paying outlet 21.

On the other hand, the bank notes taken out of the lower paying safe 33 are carried upward between the belts 88 and 89 through the paired rollers 91 and 92, and passed through the paired rollers 95. Thereafter they are delivered to the paying pocket along the same course as aforesaid.

In case of any wrong transport of the bank notes P, such as e.g. transport of two overlapping notes at one time, the detector 97 detects such abnormality, and the switching gate 98 is rocked to the position of the broken line. Thus, the bank notes subject to such wrong operation, when brought to the gate 98, are kept from being delivered to the paying pocket 85, and are further moved downward along the belt 88 to be held between the belt 88 and an endless belt 101. Then, held between the belt 101 and another endless belt 102, the notes are transferred backward in a substantially horizontal direction, and delivered to the recovery safe 34. Namely, the three belts 88, 101 and 102, which extend from the switching gate 98 to the recovery safe 34, constitute a bank note recovery conveyor system 103.

Figure 4:
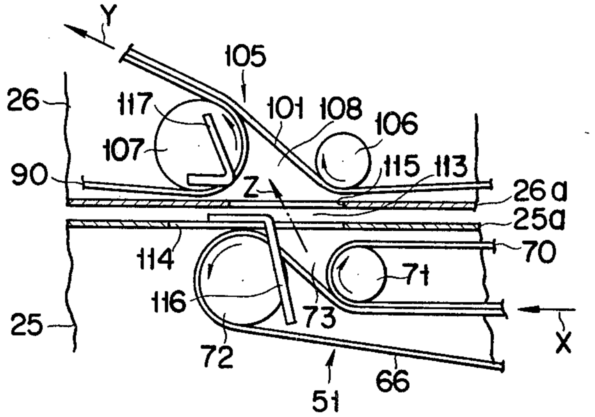
FIG. 4 is an enlarged view of a delivery portion (A) in a return path system enclosed with a chain-line circle of FIG. 3.

Moreover, the belts 90 and 101 constitute a second return path system 105 for rejectable notes. At the bottom portion of the second path system 105, as shown in FIG. 4, a small-diameter roller 106 and a large-diameter roller 107 are disposed at a longitudinal distance from each other. Portions of the belts 90 and 101, partially wound around the rollers 107 and 106 respectively, define an inverted-V-shaped rejectable note admission port 108. The top portion of the second return path system 105 terminates in a position where the belts 87 and 90 are pressed against each other on the roller 110, communicating with the takeout conveyor system 86.

In the dispensing unit 26, a motor 112 is disposed as a driving source for supplying driving power to the takeout conveyor system 86, recovery conveyor system 103 and second return path system 105. The motor 112 is connected with the power supply control section 41 when the unit 26 is set in the casing 10.

Referring now to FIG. 4, there will be described the junction between the first return path system 51 in the receiving unit 25 and the second return path system 105 in the dispensing unit 26, that is, a rejectable note delivery portion 113. In this drawing, both units 25 and 26 are in the setting position inside the casing 10.

At the delivery portion 113, openings 114 and 115 are formed in a top wall 25*a* of the receiving unit 25 and a bottom wall 26*a* of the dispensing unit 26, respectively.

The upwardly opening delivery port 73 and the downwardly opening admission port 108 face each other across the openings 114 and 115. Guide members 116 and 117 are severally arranged on the side where the upper and lower large-diameter rollers 72 and 107 exist, that is, on one side of the V-shaped ports 73 and 108.

The rejectable notes are transmitted between the belts 66 and 70 in the direction of arrow X, transferred from the delivery port 73 to the admission port 108 along the direction of arrow Z, and carried between the belts 90 and 101 in the direction of arrow Y. Then, as may be seen from FIG. 3, the delivered rejectable notes are transferred from the second return path system 105 to the takeout conveyor system 86, through which they are brought to the paying pocket 85.

In the meantime, the paired rollers 71 and 72; 106 and 107 of the first and second return path systems 51 and 105 rotate in opposite directions as indicated by the arrows of FIG. 4. Thus, the first and second return path systems 51 and 105 constitute a single continuous return path, thereby ensuring smooth delivery of the rejectable notes despite the unit construction of the receiving and dispensing devices.

The paired rollers in each return path system are preferably of different diameters as in the above-mentioned embodiment because the delivery port 73 may thereby be brought closer to the admission port 108.

Thus, in the automatic dispensing-receiving apparatus of this invention, the rejectable note return path system is connected between the intake and takeout conveyor system to allow also the rejectable notes to be delivered through the paying outlet, so that no exclusive-use outlet for the rejectable notes is needed. Accordingly, customers may enjoy easy and confusion-free transactions with use of the single paying outlet.

Moreover, the terminal end of the return path system is joined to the takeout conveyor system, so that the space for the path systems is saved. Since the endless belts forming the conveyor and return path systems are partially combinedly used, the manufacturing cost of these systems, as well as the space for them, may be reduced substantially.

Furthermore, the receiving and dispensing devices are formed into each individual unit, so that they can independently be taken out of the casing for maintenance or inspection, thereby facilitating close operations for such maintenance or inspection. Since the first and second return path systems for rejectable notes are connected at the delivery portion, the unit construction of the receiving and dispensing devices will never constitute any hindrance to the operation of the apparatus.

What is claimed is:

1. An automatic dispensing-receiving apparatus for bank notes comprising:

(a) a casing having a receiving inlet and a single paying outlet;

(b) a receiving unit including bank note intake conveyor means with one end connected to said receiving inlet and a receiving safe connected to the other end of said intake conveyor means;

(c) a dispensing unit including a paying safe and a bank note takeout-conveyor means with one end connected to said paying safe and the other end connected to said paying outlet; and (d) bank note return path means connected between said bank note intake-conveyor means and takeout conveyor means.

2. An automatic dispensing-receiving apparatus for bank notes comprising:

(a) a casing having a receiving inlet and a paying outlet;

(b) a receiving unit removably attached to said casing and including a receiving safe, bank note intake conveyor means with one end connected to said receiving safe, and first bank note return path means with one end connected to said intake conveyor means, the other end portion of said intake conveyor means corresponding to said receiving inlet when said receiving unit is in a setting position; and (c) a dispensing unit removably attached to said casing and including a paying safe, bank note takeout conveyor means with one end connected to said paying safe, and second bank note return path means with one end connected to said takeout conveyor means, the other end portion of said takeout conveyor means corresponding to said paying outlet when said paying unit is in a setting position;

(d) the respective other end portions of said first and second return path means corresponding to each other to define a single continuous return path when said receiving and dispensing units are in the respective setting positions.

3. An automatic dispensing-receiving apparatus for bank notes comprising:

(a) a casing including on the front side thereof a horizontal control surface having a receiving inlet and a vertical control surface having a paying outlet;

(b) a door capable of opening and closing on the rear side of said casing;

(c) a receiving unit disposed at a lower portion inside said casing and capable of being drawn out backward from said casing when said door is opened, said receiving unit including a receiving pocket corresponding to said receiving inlet in a setting position inside said casing and receiving bank notes put in through said receiving inlet, a receiving safe, intake conveyor means to transport the bank notes from said receiving pocket to said receiving safe, and first return path means with one end portion connected to said intake conveyor means and the other end portion extending upward, whereby rejectable ones among said bank notes are returned; and (d) a dispensing unit disposed at an upper portion inside said casing and capable of being drawn out backward from said casing when said door is opened, said dispensing unit including a paying pocket corresponding to said paying outlet in a setting position inside said casing, a paying safe, takeout conveyor means to transport the bank notes from said paying safe to said paying pocket, and second return path means for rejectable note return with one end portion connected to said takeout conveyor means and the other end portion extending downward;

(e) the respective other end portions of said first and second return path means corresponding to each other to define a delivery section performing smooth delivery of the rejectable notes from said first return path means to said second return path means when said dispensing and receiving units are in the respective setting positions inside said casing.

4. An automatic dispensing-receiving apparatus according to claims 2 or 3, wherein said other end portions of said first return path means includes a pair of rollers spaced from each other and rotating in opposite directions, a pair of belts partially wound respectively around said rollers, said belts having belt portions disposed in close contact and holding the rejectable note therebetween and another belt portions adjoining said belt portions and gradually spaced from each other to define a rejectable note delivery port, and first guide plate means disposed on one side of said delivery port; and said other end portion of said second return path means includes a pair of rollers spaced from each other and rotating in opposite directions, a pair of belts partially wound respectively around said rollers, said belts having belt portions disposed in close contact and holding the rejectable note therebetween and another belt portions adjoining said belt portions and gradually spaced from each other to define a rejectable note admission port, and second guide plate means disposed on one side of said admission port.

5. An automatic dispensing-receiving apparatus according to claim 2 or 3 further comprising a recovery safe disposed in said dispensing unit and recovery conveyor means interposed between said recovery safe and said bank note takeout conveyor means, whereby bank notes to be recovered among the ones taken out are delivered to said recovery safe.

6. An automatic dispensing-receiving apparatus according to claims 2 or 3 further comprising a temporary collecting section disposed between said one end portion of said bank note intake conveyor means and said receiving safe and temporarily collecting therein the bank notes introduced by said intake conveyor means, and auxiliary return path means for rejectable notes disposed between said temporary collecting section and said first return path means.

7. An automatic dispensing-receiving apparatus according to claim 2 or 3, wherein said receiving and paying safes can be attached to and removed from said receiving and paying units, respectively.

8. An automatic dispensing-receiving apparatus according to claims 2 or 3, wherein driving source means for said intake conveyor means and first return path means is disposed in said receiving unit, and another driving source means for said takeout conveyor means and second return path means is disposed in said paying unit.

9. An automatic dispensing-receiving apparatus for bank notes comprising:

(a) a casing including on the front side thereof a horizontal control surface having a receiving inlet and a vertical control surface having a single paying outlet;

(b) a door capable of opening and closing on the rear side of said casing;

(c) a receiving pocket disposed in said casing correspondingly to said receiving inlet and receiving bank notes put in through said receiving inlet;

(d) a bank note intake roller so located as partially to face on said receiving pocket;

(e) a receiving safe disposed at a lower backward portion of said casing and having at the top portion a receiving opening to receive the bank notes;

(f) a temporary bank note collecting device disposed in close vicinity to the top receiving opening of said receiving safe;

(g) an intake belt conveyor system carrying the bank notes from said receiving pocket to said temporary collecting device;

(h) a plurality of paying safes disposed at an upper backward portion of said casing;

(i) a takeout belt conveyor system carrying bank notes from said paying safes so as to deliver said notes to said paying outlet;

(j) a first belt return path system connected between said intake belt conveyor system and takeout belt conveyor system, whereby rejectable ones among the bank notes carried by said intake belt conveyor system are returned;

(k) a second belt return path system interposed between said temporary collecting device and said first belt return path system;

(l) a closing member disposed in a connecting position between said second belt return path system and said temporary collecting device and normally openably closing said second belt return path system; and (m) an extruding member sliding so as to extrude the bank notes collected in said temporary collecting device toward said second belt return path system.

10. An automatic dispensing-receiving apparatus according to claim 9, wherein said closing and extruding members are both formed of platelike material, and located at a distance from each other on both sides of the bank notes collected in said temporary collecting device, respectively.

* * * * *